US008769217B2

(12) United States Patent
Gorobets (10) Patent No.: US 8,769,217 B2
(45) Date of Patent: *Jul. 1, 2014

(54) METHODS AND APPARATUS FOR PASSING INFORMATION TO A HOST SYSTEM TO SUGGEST LOGICAL LOCATIONS TO ALLOCATE TO A FILE (71) Applicant: SanDisk Technologies Inc., Plano, TX (US)

(72) Inventor: Sergey Anatolievich Gorobets, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,388

(22) Filed: Aug. 7, 2013

(65) Prior Publication Data
US 2013/0326128 A1    Dec. 5, 2013

Related U.S. Application Data (63) Continuation of application No. 12/190,767, filed on Aug. 13, 2008, now Pat. No. 8,516,203.

(51) Int. Cl.
*G06F 12/00*    (2006.01)
*G06F 13/00*    (2006.01)

(52) U.S. Cl.
USPC ............ 711/154; 711/100; 711/170; 711/200

(58) Field of Classification Search
CPC ...... G06F 12/00; G06F 12/02; G06F 12/0646
USPC .................. 711/100, 154, 170, 200
See application file for complete search history.

(56) References Cited

U.S. PATENT DOCUMENTS

| 6,098,077 | A  |   | 8/2000  | Sassa |
| 6,317,872 | B1 | * | 11/2001 | Gee et al. ...................... 717/152 |
| 6,499,083 | B1 | * | 12/2002 | Hamlin ......................... 711/112 |
| 7,984,230 | B2 |   | 7/2011  | Nasu et al. |
| 2004/0268006 | A1 |   | 12/2004 | Kang et al. |
| 2005/0144360 | A1 |   | 6/2005 | Bennett et al. |
| 2007/0033375 | A1 |   | 2/2007 | Sinclair et al. |
| 2008/0028190 | A1 |   | 1/2008 | Okako et al. |
| 2009/0138654 | A1 |   | 5/2009 | Sutardja |

OTHER PUBLICATIONS

Office Action for U.S. Appl. No. 12/190,767, dated Oct. 17, 2011, 9 pages.
Office Action for U.S. Appl. No. 12/190,767, dated Apr. 24, 2012, 11 pages.
Office Action for U.S. Appl. No. 12/190,767, dated Dec. 20, 2012, 12 pages.
Notice of Allowance for U.S. Appl. No. 12/190,767, dated Apr. 24, 2013, 10 pages.

* cited by examiner

*Primary Examiner* — Tuan Thai
(74) *Attorney, Agent, or Firm* — Brinks Gilson & Lione (57) ABSTRACT Methods and apparatus for passing information to a host system to suggest logical locations to allocate to a file are disclosed. Generally, when a host system determines a need to allocate a logical location to a file, the host system sends a non-data command to a memory system. In response, the memory system sends information to the host system that includes one or more logical locations to allocate to the file. By suggesting one or more logical locations to allocate to a file, the memory system may reduce a number of data consolidation or garbage collection operations that will need to be performed in the future, thereby improving performance of the memory system.

20 Claims, 10 Drawing Sheets

McMETHODS AND APPARATUS FOR PASSING
INFORMATION TO A HOST SYSTEM TO
SUGGEST LOGICAL LOCATIONS TO
ALLOCATE TO A FILE

RELATED APPLICATIONS

The present application is a continuation of U.S. patent application Ser. No. 12/190,767 (still pending), filed Aug. 13, 2008, the entirety of which is hereby incorporated by reference.

TECHNICAL FIELD

This application relates generally to data communication between memory systems, such as re-programmable non-volatile semiconductor flash memory, and a host device to which the memory is connected or connectable.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system operates without knowledge of this mapping.

A drawback of hosts that operate in a logical address space, also referred to as logical block address (LBA) format, is fragmentation and the challenge this poses to a memory system to efficiently store data. Data written by a host file system may often be fragmented in logical address space, where many fixed logical groups are only partially updated with new data. The fragmentation may occur as a result of cumulative fragmentation of free space by the host file system, and possibly even as a result of inherent fragmentation of individual files by the host file system. The fragmented logical groups will need to be rewritten in full in a different physical block. The process of rewriting the fragmented logical groups may involve copying unrelated data from the prior location of the logical group. This overhead can result in lower performance and reduced device lifetime for a flash memory system. The LBA format information sent by the host provides little or no opportunity for a memory system to adjust or optimize its storage routines to avoid this possible lower performance and reduced lifetime.

BRIEF SUMMARY

In order to address the need for improved memory system performance, methods and apparatus for implementing commands to suggest to a host system one or more logical locations to allocate to a file are disclosed.

According to a first aspect, a method for transferring data between a host system and a re-programmable non-volatile mass storage system is described. Generally the non-volatile mass storage system receives a non-data command from a host system. In response, the non-volatile mass storage system sends information to the host system, where the information comprising one or more logical locations that may be allocated to a file.

According to a second aspect, another method for transferring data between a host system and a re-programmable non-volatile mass storage system is described. Generally, a host system identifies a file to be stored at a mass storage system and passes a non-data command to the mass storage system. The host system receives information from the mass storage system comprising one or more logical locations that may be allocated to a file. The host system then allocates at least one of the one or more logical locations to the file.

Other features and advantages of the invention will become apparent upon review of the following drawings, detailed description and claims.

DETAILED DESCRIPTION

The present disclosure is directed to methods and apparatus for implementing extension commands to suggest to a host system one or more logical locations to allocate to a file. As described in more detail below, by suggesting one or more logical locations to allocate to a file, a memory system may reduce the number of data consolidation or garbage collection operations that will need to be performed in the future, thereby improving performance of the memory system.

A flash memory system suitable for use in implementing aspects of the invention is shown in FIGS. 1-6. A host system 100 of FIG. 1 stores data into and retrieves data from a non-volatile memory 102 such as flash memory. The memory 102 is illustrated to be in the form of a card that is removably connected to the host through mating parts 104 and 106 of a mechanical and electrical connector. There are currently many different flash memory cards that are commercially available, examples being the CompactFlash (CF), the MultiMediaCard (MMC), Secure Digital (SD), miniSD, SmartMedia and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Figure 2:
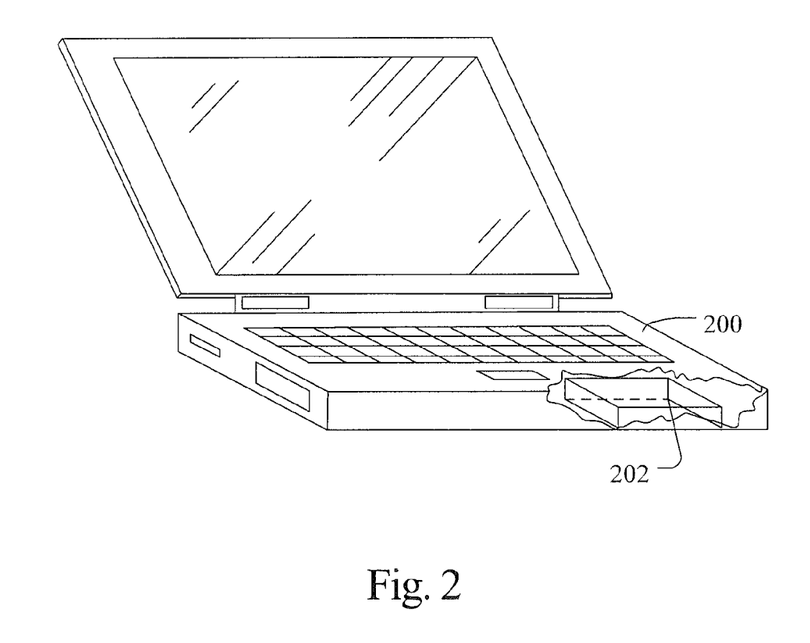
FIG. 2 is a sectional view of a laptop computer containing a solid state disk drive suitable for implementing the methods and systems described herein

Other forms of flash memory such as solid state disks may also be used as the memory system. As shown in FIG. 2, the host may be a laptop computer 200 that incorporates a built-in solid state disk (SSD) 202 comprised of flash-based memory. A SSD 202 may provide advantages over a typical hard disk drive, such as lower power consumption, smaller size, quieter operation, and faster read and write speeds.

The various systems that may use memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

Figure 1:
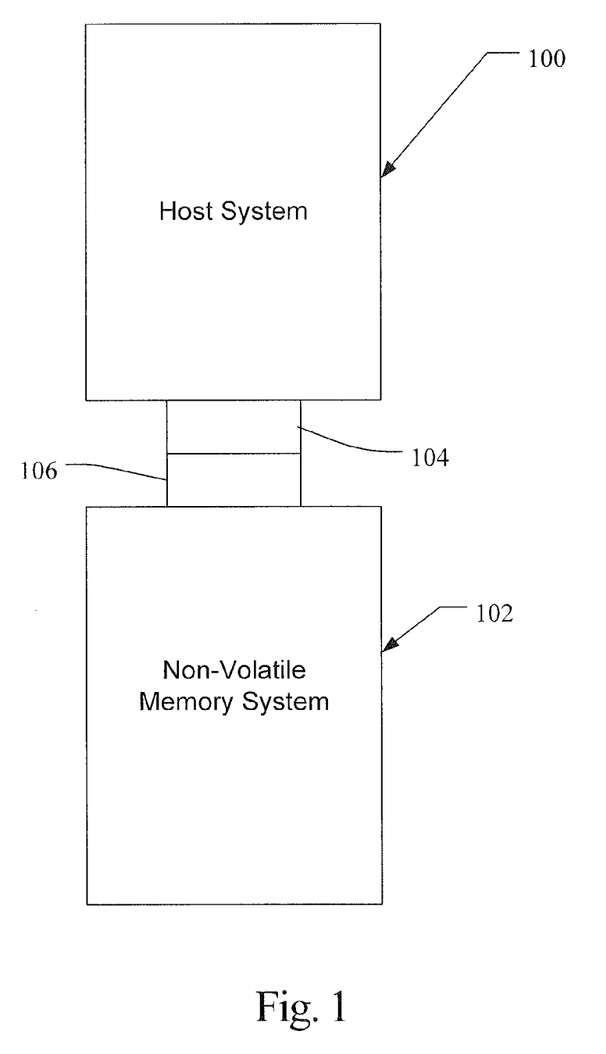
FIG. 1 schematically illustrates a host and a connected non-volatile memory system.
Figure 3:
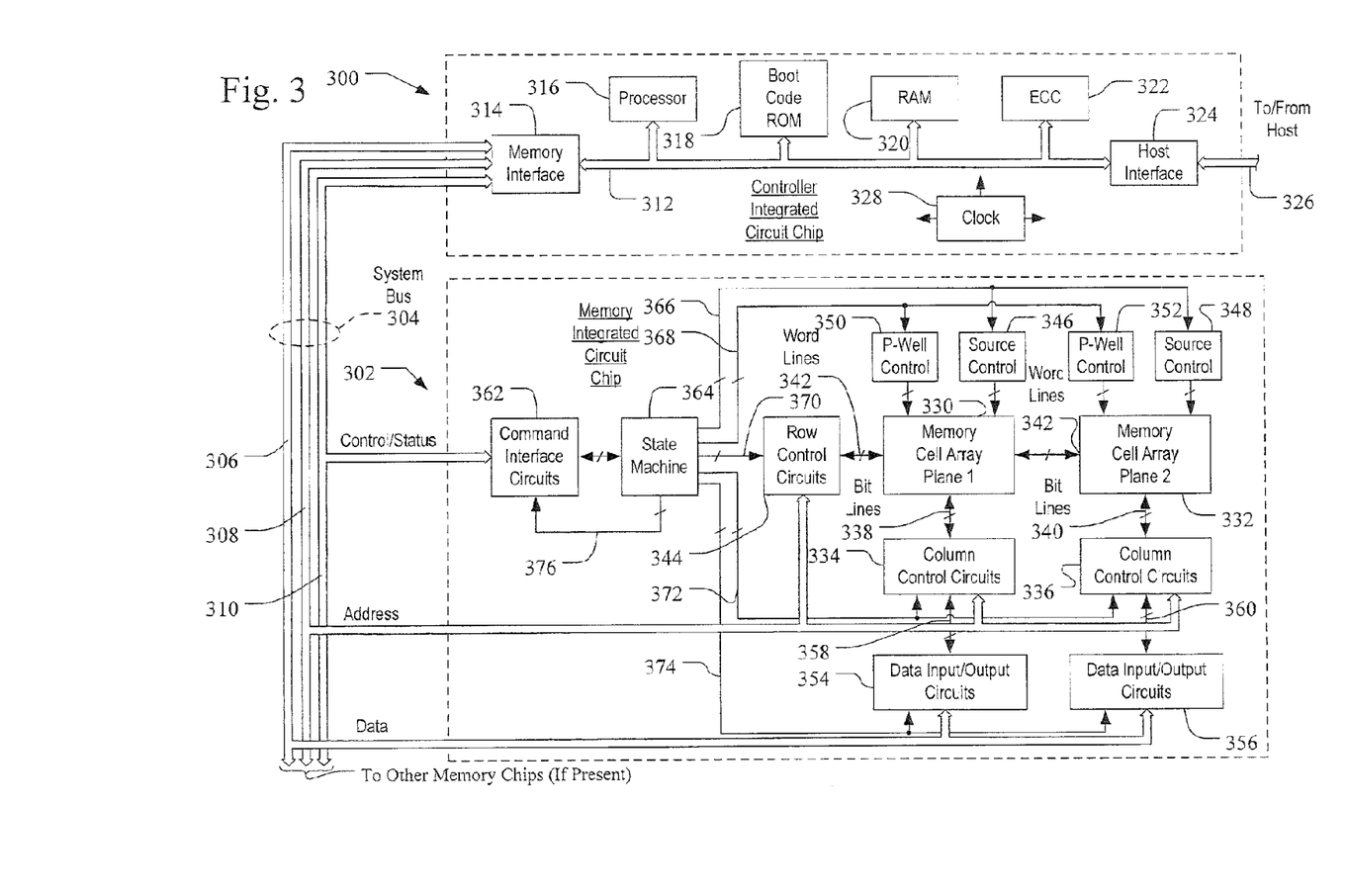
FIG. 3 is a block diagram of an example flash memory system for use as the non-volatile memory of FIG. 1 or 2.

The non-volatile memory system 102, 202 may include flash memory, and circuits that both interface with the host 100, 200 to which the card or SSD is connected for passing data back and forth and to control the memory. Referring to FIG. 3, circuitry of a typical flash memory system that may be used as the non-volatile memory system 102, 202 of FIGS. 1 and 2 is described. The system controller 300 typically converts between logical addresses of data used by the host 100, 200 and physical addresses of the memory 302 during data programming and reading. The controller 300 is usually implemented on a single integrated circuit chip that is connected in parallel with one or more integrated circuit memory chips over a system bus 304, a single such memory chip being shown in FIG. 2. The particular bus 304 that is illustrated includes a separate set of conductors 306 to carry data, a set 308 for memory addresses and a set 310 for control and status signals. Alternatively, a single set of conductors may be time shared between these three functions.

A typical controller chip 300 has its own internal bus 312 that interfaces with the system bus 304 through interface circuits 314. The primary functions normally connected to the bus are a processor 316 (such as a microprocessor or microcontroller), a read only memory (ROM) 318 containing code to initialize ("boot") the system, random access memory (RAM) 320 used primarily to buffer data being transferred between the memory and a host, and circuits 322 that calculate and check an error correction code (ECC) for data passing through the controller between the memory and the host. The controller bus 312 interfaces with a host system through circuits 324, which, in the case of the system of FIG. 1 being contained within a memory card, is done through external contacts 326 of the card that are part of the connector 106. A clock 328 is connected with and utilized by each of the other components of the controller 300.

The memory chip 302, as well as any other connected with the system bus 304, may contain an array of memory cells organized into multiple sub-arrays or planes, two such planes 330 and 332 being illustrated for simplicity but more, such as four or eight such planes, may instead be used. Alternatively, the memory cell array of the chip 302 may not be divided into planes. When so divided however, each plane has its own column control circuits 334 and 336 that are operable independently of each other. The circuits 334 and 336 receive addresses of their respective memory cell array from the address portion 308 of the system bus 304, and decode them to address a specific one or more of respective bit lines 338 and 340. The word lines 342 are addressed through row control circuits 344 in response to addresses received on the address bus 308. Source voltage control circuits 346 and 348 are also connected with the respective planes, as are p-well voltage control circuits 350 and 352. If the memory chip 302 has a single array of memory cells, and if two or more such chips exist in the system, the array of each chip may be operated similarly to a plane or sub-array within the multi-plane chip described above.

Data are transferred into and out of the planes 330 and 332 through respective data input/output circuits 354 and 356 that are connected with the data portion 306 of the system bus 304. The circuits 354 and 356 provide for both programming data into the memory cells and for reading data from the memory cells of their respective planes, through lines 358 and 360 connected to the planes through respective column control circuits 334 and 336.

Although the controller 300 controls the operation of the memory chip 302 to program data, read data, erase and attend to various housekeeping matters, each memory chip also contains some controlling circuitry that executes commands from the controller 300 to perform such functions. Interface circuits 362 are connected to the control and status portion 310 of the system bus 304. Commands from the controller are provided to a state machine 364 that then provides specific control of other circuits in order to execute these commands. Control lines 366, 368, 370, 372 and 374 connect the state machine 364 with these other circuits as shown in FIG. 3. Status information from the state machine 364 is communicated over lines 376 to the interface 362 for transmission to the controller 300 over the bus portion 310.

A NAND architecture of the memory cell arrays 330 and 332 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and U.S. patent application publication No. 2003/0147278.

Figure 4:
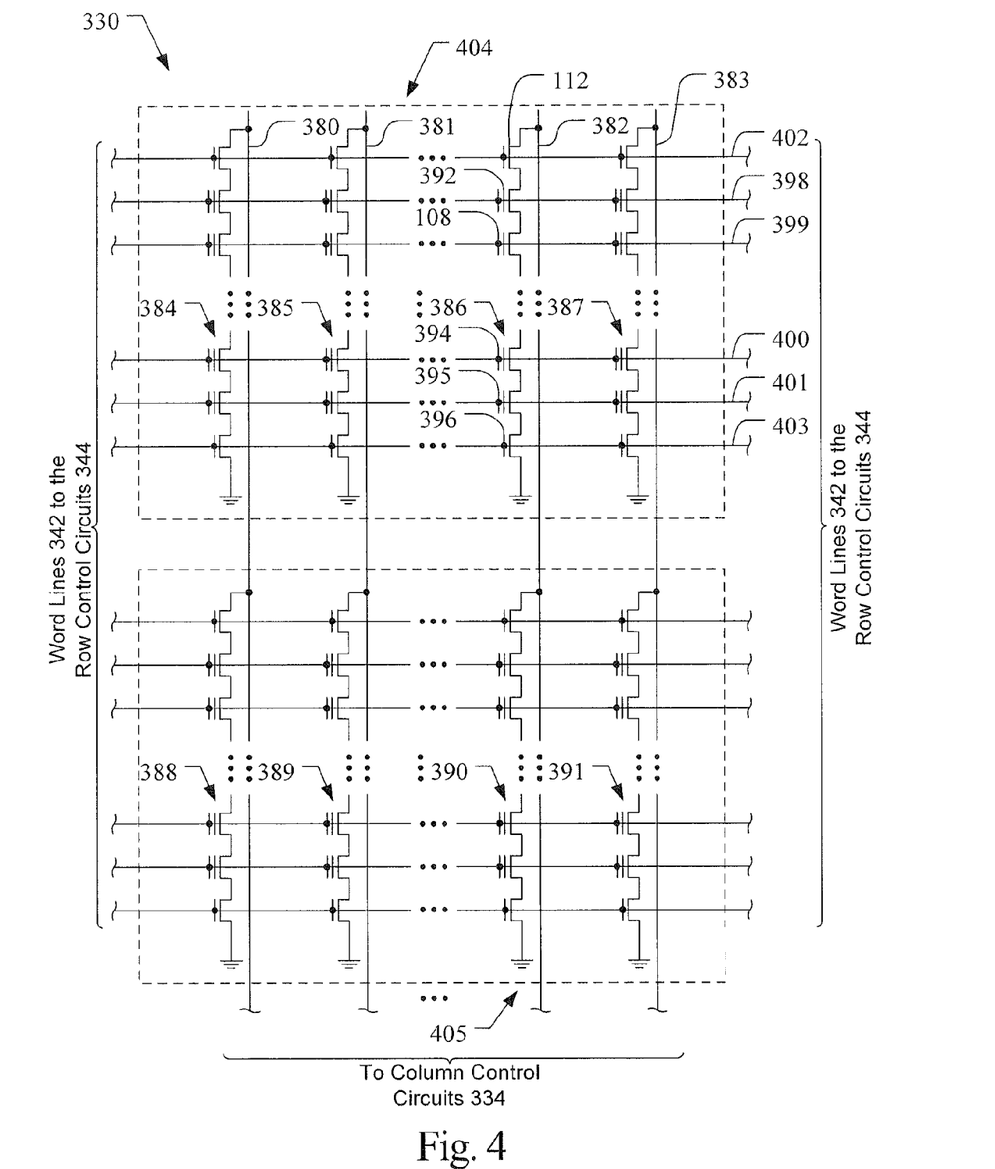
FIG. 4 is a representative circuit diagram of a memory cell array that may be used in the system of FIG. 3.

An example NAND array is illustrated by the circuit diagram of FIG. 4, which is a portion of the memory cell array 330 of the memory system of FIG. 3. A large number of global bit lines are provided, only four such lines 380-383 being shown in FIG. 4 for simplicity of explanation. A number of series connected memory cell strings 384-387 are connected between one of these bit lines and a reference potential. Using the memory cell string 386 as representative, a plurality of charge storage memory cells 392-395 are connected in series with select transistors 396 and 397 at either end of the string. When the select transistors of a string are rendered conductive, the string is connected between its bit line and the reference potential. One memory cell within that string is then programmed or read at a time.

Word lines 398-401 of FIG. 4 individually extend across the charge storage element of one memory cell in each of a number of strings of memory cells, and gates 402 and 403 control the states of the select transistors at each end of the strings. The memory cell strings that share common word and control gate lines 398-403 are made to form a block 403 of memory cells that are erased together. This block of cells contains the minimum number of cells that are physically erasable at one time. One row of memory cells, those along one of the word lines 398-401, are programmed at a time. Typically, the rows of a NAND array are programmed in a prescribed order, in this case beginning with the row along the word line 401 closest to the end of the strings connected to ground or another common potential. The row of memory cells along the word line 400 is programmed next, and so on, throughout the block 404. The row along the word line 398 is programmed last.

A second block 405 is similar, its strings of memory cells being connected to the same global bit lines as the strings in the first block 404 but having a different set of word and control gate lines. The word and control gate lines are driven to their proper operating voltages by the row control circuits 344. If there is more than one plane or sub-array in the system, such as planes 1 and 2 of FIG. 3, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. Pat. Pub. No. 2003/0109093.

Figure 5:
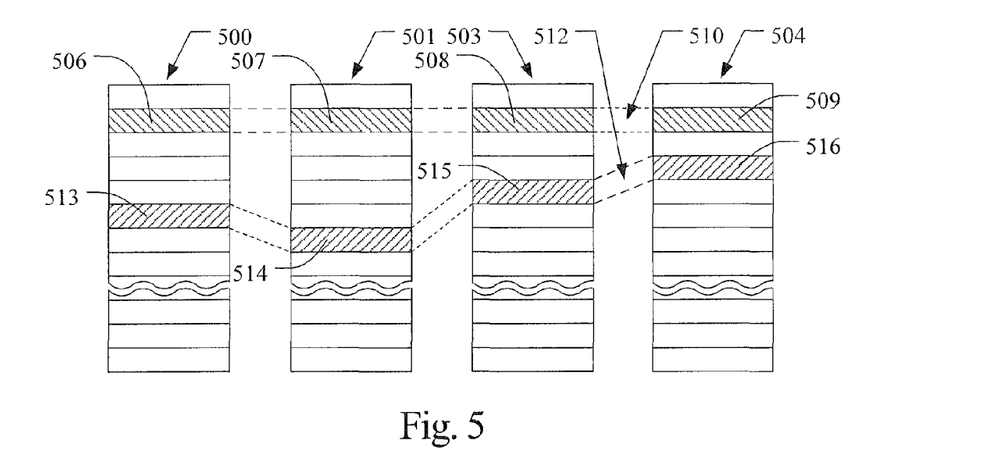
FIG. 5 illustrates an example physical memory organization of the system of FIG. 3.

FIG. 5 conceptually illustrates an organization of a flash memory cell array in the non-volatile memory 102 (FIG. 1) that is used as an example in further descriptions below. Four planes or sub-arrays 500-503 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 5 by rectangles, such as blocks 506, 507, 508 and 509, located in respective planes 500-503. There can be dozens or hundreds of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 506-509 are shown to form one metablock 510. All of the cells within a metablock are typically erased together. The blocks used to form a metablock need not be restricted to the same relative locations within their respective planes, as is shown in a second metablock 512 made up of blocks 513-516. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
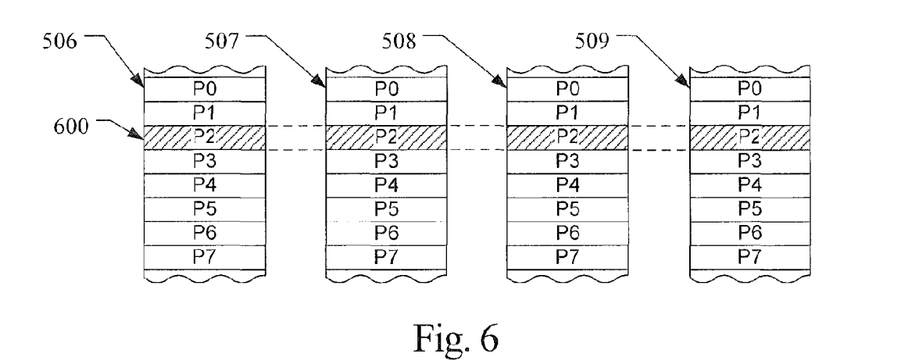
FIG. 6 shows an expanded view of a portion of the physical memory of FIG. 5.

The individual blocks are in turn divided for operational purposes into pages of memory cells, as illustrated in FIG. 6. The memory cells of each of the blocks 506-509, for example, are each divided into eight pages P0-P7. Alternatively, there may be 16, 32 or more pages of memory cells within each block. The page is the unit of data programming and reading within a block, containing the minimum amount of data that are programmed or read at one time. In the NAND architecture of FIG. 4, a page is formed of memory cells along a word line within a block. However, in order to increase the memory system operational parallelism, such pages within two or more blocks may be logically linked into metapages. A metapage 600 is illustrated in FIG. 6, being formed of one physical page from each of the four blocks 506-509. The metapage 600, for example, includes the page P2 in of each of the four blocks but the pages of a metapage need not necessarily have the same relative position within each of the blocks. A metapage is the maximum unit of programming.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage 600 formed of physical pages of multiple planes, as illustrated in FIG. 6, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 4, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect every other string to their respective bit lines in response to another control signal. Two pages of data are therefore written into each row of memory cells.

Figure 7:
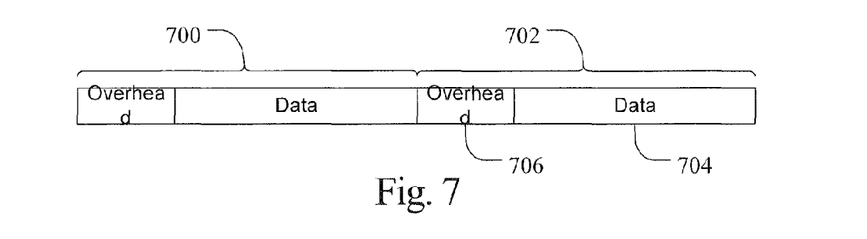
FIG. 7 shows a further expanded view of a portion of the physical memory of FIGS. 5 and 6.

The amount of data in each logical page is typically an integer number of one or more sectors of data, each sector containing 512 bytes of data, by convention. The sector is the minimum unit of data transferred to and from the memory system. FIG. 7 shows a logical data page of two sectors 700 and 702 of data of a page or metapage. Each sector usually contains a portion 704 of 512 bytes of user or system data being stored and another number of bytes for overhead data 706 related either to the data in the portion 704 or to the physical page or block in which it is stored. The number of bytes of overhead data 706 is typically 16 bytes, making the total 528 bytes for each of the sectors 700 and 702. The overhead portion 706 may contain an ECC calculated from the data portion 704 during programming, its logical address, an experience count of the number of times the block has been erased and re-programmed, one or more control flags, operating voltage levels, and/or the like, plus an ECC calculated from such overhead data 706. Alternatively, the overhead data 706, or a portion of it, may be stored in different pages in other blocks. In either case, a sector denotes a unit of stored data with which an ECC is associated.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows is increased. For this reason, the width of flash memories is being extended in order to increase the amount of data in a page and a metapage.

The physically small re-programmable non-volatile memory cards and flash drives identified above are commercially available with various data storage capacities. The host manages data files generated or used by application software or firmware programs executed by the host. Word processing data files and drawing files of computer aided design (CAD) software are examples of data files generated by application software in general computer hosts such as PCs, laptop computers and the like. A digital camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

Figure 8:
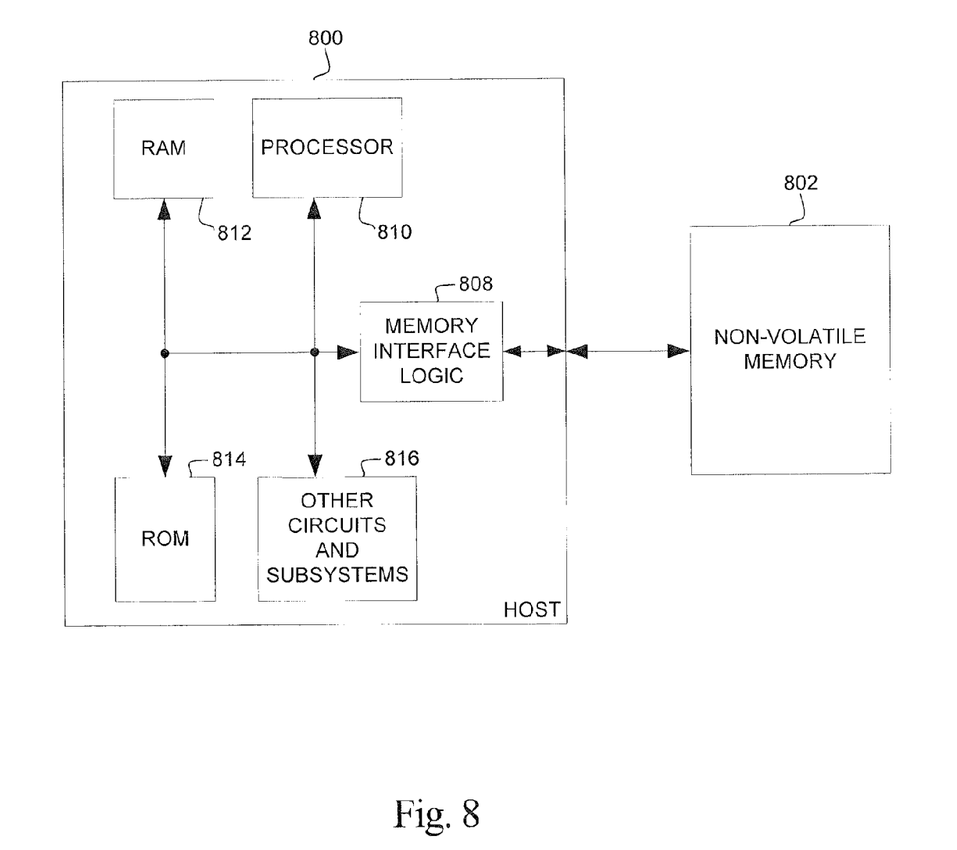
FIG. 8 is a block diagram of a host that may implement the method of providing host file and LBA information disclosed herein.

FIG. 8 is a more detailed block diagram of an embodiment of a host system 800. Data transfers between the host 800 and the non-volatile memory 802 are made through the memory interface logic 808. The host 800 may also include a microprocessor 810, a read-only memory (ROM) 812 for storing firmware code, and a random access memory (RAM) 814. Other circuits and subsystems 816 may include a high capacity magnetic data storage disk drive, and user interface circuitry such as a keyboard, a keypad, a monitor, or display, depending upon the particular host system.

If the host 800 is a PC, for example, the RAM 812 or other circuits and subsystems 816 may include word processing, graphics, control or other popular application software executable by the processor 810. If the host 800 is a camera, cellular telephone or other host system that is primarily dedicated to performing a single set of functions, the applications may include software that operates the camera to take and store pictures, the cellular telephone to make and receive calls, and the like. In embodiments where the host 800 is a PC, the memory interface logic 808 may be structured to assign addresses in a logical address space to data that is managed by the host. The host 800 may include a host file system that manages the memory allocations made by the host to files managed on the host and stored in one or more memory devices. The host file system may be part of an operating system stored in software, firmware or a combination of software and firmware.

Figure 9:
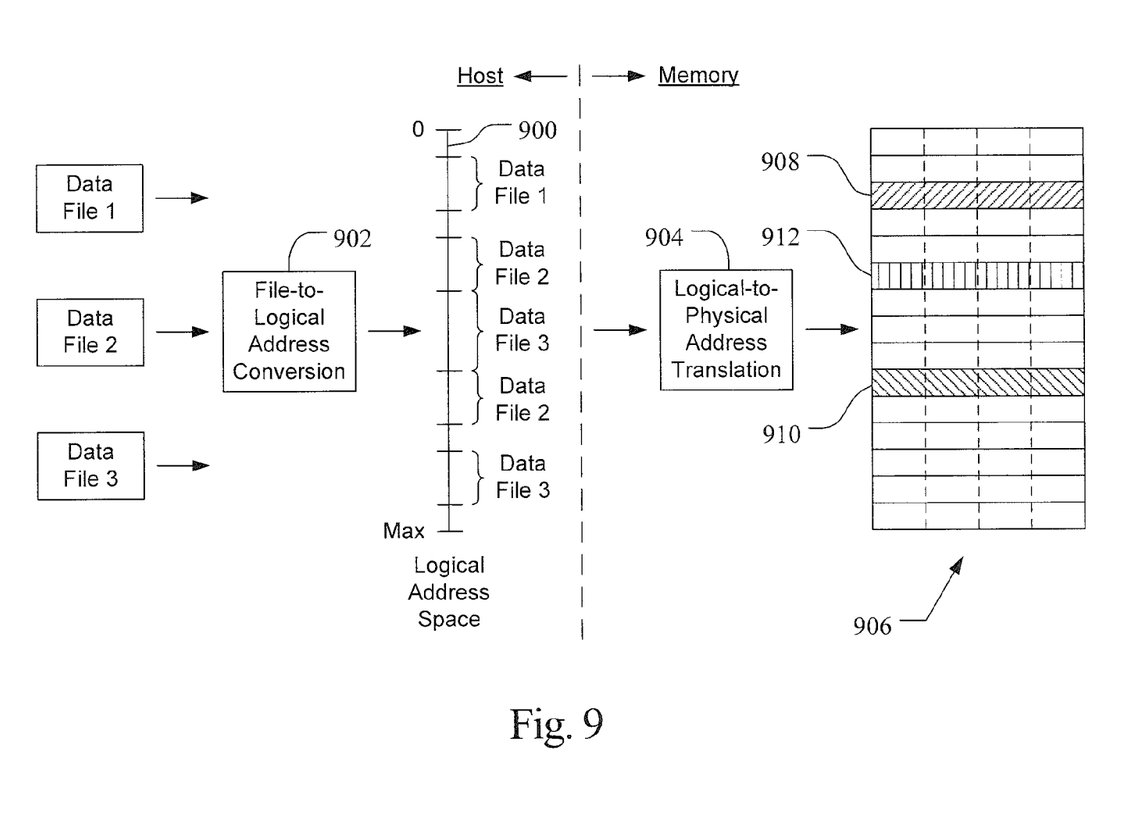
FIG. 9 illustrates a logical address space interface between a host and a re-programmable memory system.

A common logical interface between a host and a memory system is illustrated in FIG. 9. A continuous logical address space 900 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Data Files 1, 2 and 3 are shown in the example of FIG. 9 to have been created. An application program running on the host system creates each file as an ordered set of data and identifies it by a unique name or other reference. Enough available logical address space not already allocated to other files is assigned by the host to Data File 1, by a file-to-logical address conversion 902. Data File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a Data File 2 is later created by the host, the host similarly assigns two different ranges of contiguous addresses within the logical address space 900, by the file-to-logical address conversion 902 of FIG. 9. A file need not be assigned contiguous logical addresses but rather can be fragments of addresses in between address ranges already allocated to other files. This example then shows that yet another Data File 3 created by the host is allocated other portions of the host address space not previously allocated to the Data Files 1 and 2 and other data.

The host keeps track of the memory logical address space by maintaining a file allocation table (FAT), where the logical addresses assigned by the host to the various host files by the conversion 902 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through the typical host/card interface being described, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 904 represents a working table of these logical-to-physical address conversions, which is maintained by the memory system controller.

The memory system controller is programmed to store data within the blocks and metablocks of a memory array 906 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 908 is usually allocated as a reserved block for storing operating firmware and data used by the memory controller. Another metablock 910, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 904.

In a typical memory system, a few extra blocks of storage capacity are provided than are necessary to store the amount of data within the address space 900. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 912, are typically maintained in an erased block pool. Most of the remaining metablocks shown in FIG. 9 are used to store host data. When the host writes data to the memory system, the function 904 of the controller converts the logical addresses assigned by the host to physical addresses within a metablock in the erased block pool. Other metablocks not being used to store data within the logical address space 900 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Figure 10:
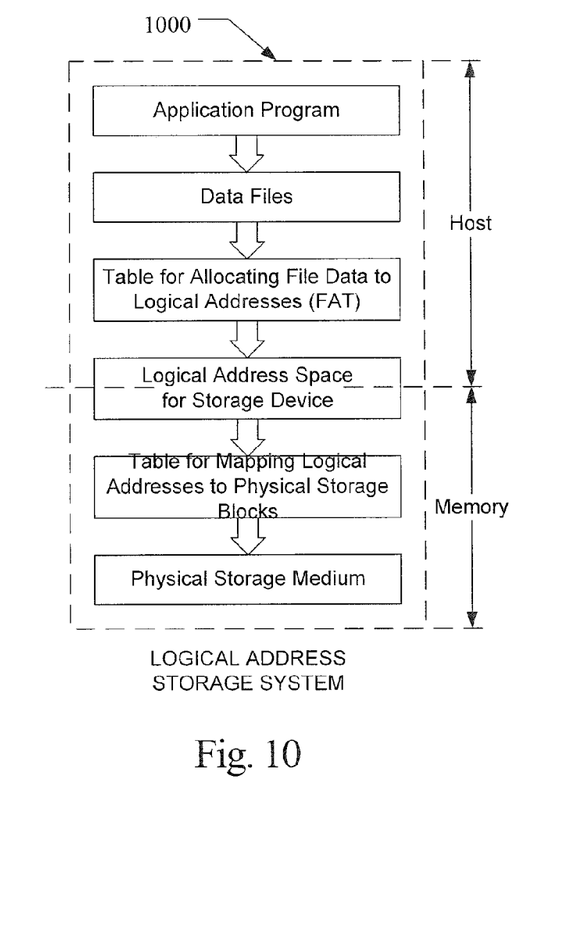
FIG. 10 illustrates in a different manner than FIG. 9 a logical address space interface between a host and a re-programmable memory system.

Referring to FIG. 10, a data flow 1000 of the typical logical address host/memory interface as already shown in FIG. 9 is illustrated differently. The host generated data files are allocated logical addresses by the host 800. The memory system 802 then sees these logical addresses and maps them into physical addresses of blocks of memory cells in the memory system's physical storage medium where the data are actually stored.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 900, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory, so data consolidation or garbage collection is needed first to clear one or more metablocks of valid data, which can then be erased. Attention has therefore been directed to managing control of the memory in order to minimize such disruptions. Many such techniques are described in the following United States patent applications, referenced hereinafter as the "LBA Patent Applications": Ser. No. 10/749,831, filed Dec. 30, 2003, entitled "Management of Non-Volatile Memory Systems Having Large Erase Blocks"; Ser. No. 10/750,155, filed Dec. 30, 2003, entitled "Non-Volatile Memory and Method with Block Management System"; Ser. No. 10/917,888, filed Aug. 13, 2004, entitled "Non-Volatile Memory and Method with Memory Planes Alignment"; Ser. No. 10/917,867, filed Aug. 13, 2004; Ser. No. 10/917,889, filed Aug. 13, 2004, entitled "Non-Volatile Memory and Method with Phased Program Failure Handling"; Ser. No. 10/917,725, filed Aug. 13, 2004, entitled "Non-Volatile Memory and Method with Control Data Management"; Ser. No. 11/192,220, filed Jul. 27, 2005, entitled "Non-Volatile Memory and Method with Multi-Stream Update Tracking"; Ser. No. 11/192,386, filed Jul. 27, 2005, entitled "Non-Volatile Memory and Method with Improved Indexing for Scratch Pad and Update Blocks"; and Ser. No. 11/191,686, filed Jul. 27, 2005, entitled "Non-Volatile Memory and Method with Multi-Stream Updating", and these applications are hereby incorporated herein by reference.

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type. Similar techniques may be used in other files systems. For example, in memory devices operating using NTFS a review of the $bitmap file accessible via the MFT may be used to interpret file information.

To operate a host system and a memory system efficiently, it is desirable for the memory system to suggest to the host system one or more logical locations to allocate to a file before the host system allocates a logical location to the file. By suggesting one or more logical locations to allocate to the file, the memory system may reduce the number of data consolidation or garbage collection operations that will need to be performed in the future, thereby improving performance of the memory system.

Figure 11:
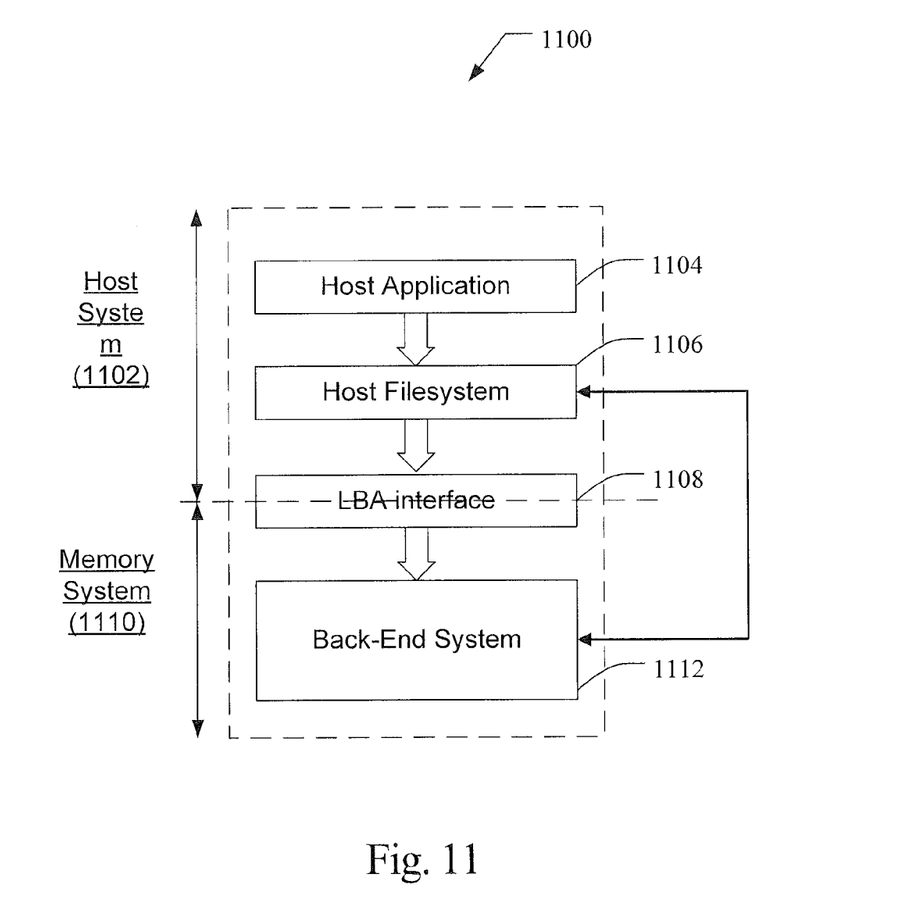
FIG. 11 is a block diagram of one embodiment of a system that passes information to a host system to suggest one or more logical locations to allocate to a file.

FIG. 11 is a block diagram of one embodiment of a system 1100 that passes information to a host system 1102 to suggest one or more logical locations to allocate to a file. The system 1100 may include a host system 1102 that includes a host application 1104, a host filesystem 1106, and a LBA interface 1108, and a memory system 1110 including a back-end system 1112 that is in communication with the host system 1102 at the LBA interface 1108.

As explained in more detail below, in order to allow the host system 1102 to intelligently allocate logical locations to a file, the memory system 1110 passes information to the host system 1102 that indicate one or more logical locations in a logical address space of the hose to allocate to the file. In some implementations, the memory system 1110 may pass the information to the host system 1102 by appending the information to another existing command, such as an extension command, that is sent from the memory system 1110 to the host system 1102. However, in other implementations, the memory system 1110 sends the information to the host system 1102 distinct from any other command sent between the memory system 1110 and the host system 1102. The one or more logical locations may include locations such as a preferred specific logical location that may be allocated to a file, multiple logical locations over which to allocate fragments of a file, multiple logical locations to allocate to a file, or a range of logical addresses that may be allocated to a file.

The memory system 1110 passes the information to the host system 1102 in response to a non-data command passed from the host system 1102 to the memory system 1110. Generally, a non-data command is a command from the host system 1102 to the memory system 1110 that does not result in a logical data transfer from the host system 1102 to the memory system 1110.

Typically, the host system 1102 passes the non-data command to the memory system 1110 upon a determination that the host system 1102 needs to allocate a logical location to a new file or other unit of data. In some implementations, the non-data command may include information such as a length of a file, a data type of a file, whether a file will be stored for a long or short period of time, whether a file will be frequently updated, whether a file is a directory file, and/or one or more logical locations suggested by the host system to allocate to the file.

After receiving the non-data command, the memory system 1110 identifies the one or more logical locations that may be allocated to a file. In some implementations, the memory system 1110 may identify logical locations to allocate to a file based on a current update stream or a current update block regardless of any properties of a file. A current update stream or a current update block is a logical area or physical area that the memory system 1110 is currently updating for reasons such as invalid or obsolete data. By passing logical locations associated with the current update stream or the current update block to the host system 1102, the memory system 1110 may reduce the amount of data consolidation operations and/or garbage collection operations that must be performed in response to future write commands. Specifically, because the memory system 1110 has already allocated resources to the current update stream or current update block, if the host system 1102 allocates a file to a logical location of the current update stream or current update block and writes data from the file to the memory system 1110, the memory system 1110 will not have to perform additional operations, such as additional garbage collection operations, to complete the storage of the data from the file, thereby improving the performance of the memory system 1110.

In other implementations, when the non-data command includes information such as the length of a file, a data type of a file, whether a file will be stored for a long or short period of time, whether a file will be frequently updated, and/or whether a file is a directory file, the memory system 1110 identifies the one or more logical locations to allocate to the file based on the information within the received non-data command. For example, the memory system 1110 may examine a File Allocation Table and identify logical locations that minimize a number of logical groups over which the file must be stored as fragments, or the memory system 1110 may identify logical locations that are adjacent to recently written data. Further, the memory system 1110 may examine a File Allocation Table and identify locations that are close to, or adjacent to, data of the same data type as the file; identify one or more logical groups storing data that needs to be relocated to avoid possible data loss; and/or identify logical locations that are stored in a block scheduled for a rewrite operations as part of a Read Scrub operation or a Wear Levelling operation. Examples of Read Scrub operations and Wear Levelling operations are described in U.S. Pat. No. 7,315,917, filed Dec. 19, 2005.

In yet other implementations, when the non-data command includes information such as one or more logical locations suggested by the host system to allocation to a file, the memory system 1110 may perform operations such as rating one or more of the suggested logical locations and/or ranking one or more of the suggested logical locations. For example, the memory system 1110 may rate or rank logical locations suggested by the host system based on a number of garbage collection operations that the memory system 1110 would need to perform to store new data at the logical location or based on an amount of resources that the memory system 1110 would need to allocate the logical location to store new data at the logical location. To increase efficiency, the memory system 1110 would rate or rank a logical location that would require few garbage collection operations to store new data at the logical location above a logical location that would require many garbage collection operations to store new data at the logical location.

When the memory system 1110 rates or ranks logical locations suggested by the host system, the information the memory system 1110 sends information to the host system 1102 indicating one or more logical locations to allocate to a file may include a rating of one or more of the logical locations suggested by the host system on a scale, rankings of one or more of the logical locations suggested by the host system, and/or an indicator of which location of the one or more logical locations suggested by the host system is a preferred logical location to allocate to the file.

As shown in FIG. 11, in some implementations the host filesystem 1106 bypasses the LBA interface 1108 to send the non-data command to the back-end system 1112 and/or the back-end system 1112 bypasses the LBA interface 1108 to send the information to the host filesystem 1106. However, in other implementations the host filesystem 1106 sends the non-data command to the back-end system 1112 through the LBA interface 1108 and the back-end system 1112 sends the information to the host filesystem 1106 through the LBA interface 1108.

Figure 12:
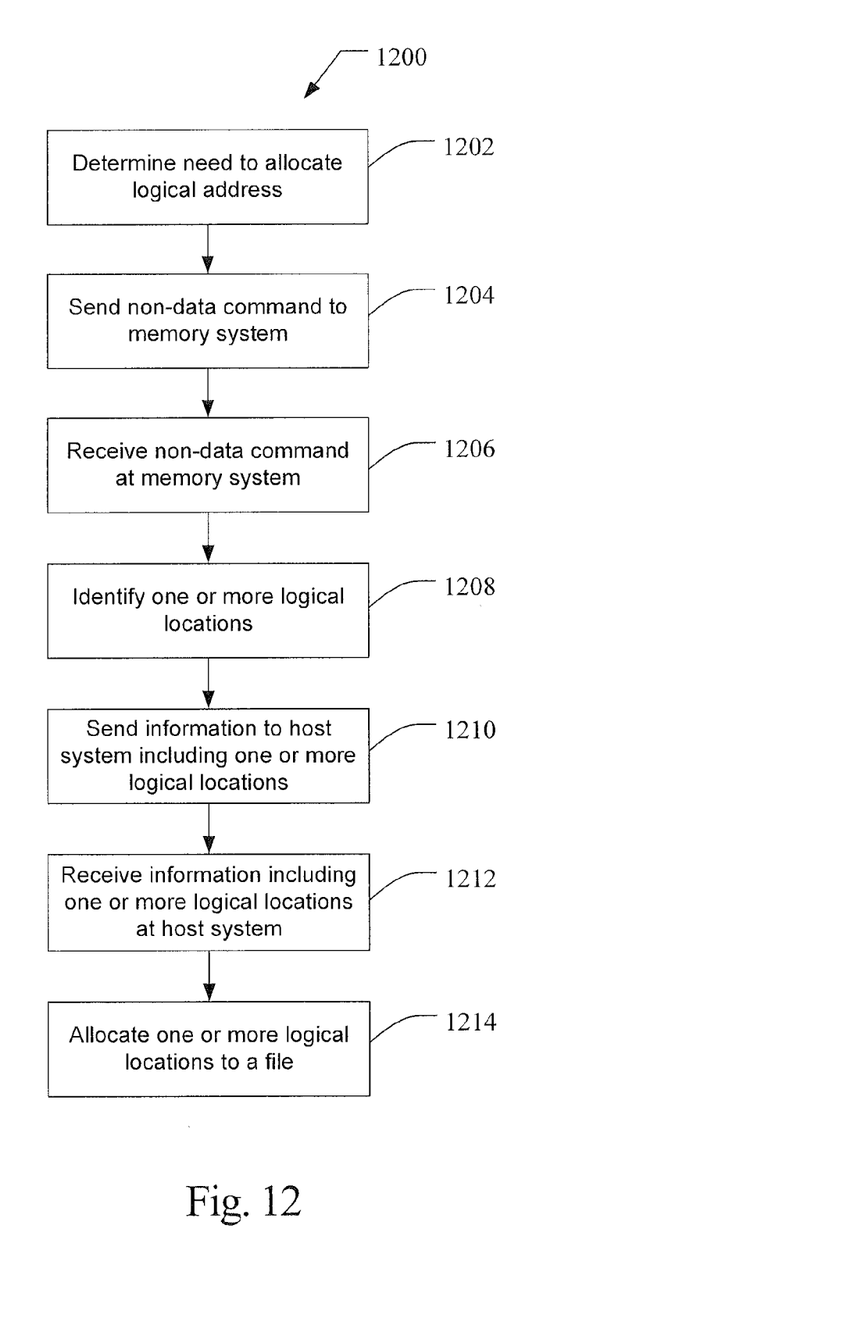
FIG. 12 is a flow chart of one embodiment of a method for passing information to a host system to suggest one or more logical locations to allocate to a file.

FIG. 12 is a flow chart of one embodiment of a method for passing information to a host system to suggest one or more logical locations to allocate to a file. The method 1200 begins at step 1202 with the host system determining a need to allocate a logical address to a new file or other unit of data, or the host system identifying an existing file to be stored at a memory system. In response, at step 1204 the host system sends a non-data command to the memory system. As described above, in some implementations, the non-data command may include information such as a length of a file, a data type of a file, and/or one or more suggested logical locations.

At step 1206, the memory system receives the non-data command from the host system. In response, at step 1208 the memory system identifies one or more logical locations in the host system's logical address space that may be allocated to the file. As described above, when the received non-data command includes information such as a length of a file, a data type of a file, whether a file will be stored for a long or short period of time, whether a file will be frequently updated, whether a file is a directory file, and/or one or more logical locations suggested by the host system to allocate to the file, at step 1208 the memory system identifies the one or more logical locations that may be allocated to the file based on the information within the received non-data command. At step 1210, the memory system sends information, such as an extension command, to the host system indicating at least a portion of the one or more logical locations identified at step 1208 that may be allocated to the file.

At step 1212, the host system receives the extension from the memory system. Then, at step 1214, the host system allocates at least one of the one or more logical locations identified in the received extension to the file.

Methods and apparatus are described above for passing information to a host system to suggest logical locations to allocate to a file. By suggesting one or more logical locations to allocate to the file, a memory system may reduce the number of data consolidation or garbage collection operations that will need to be performed in the future, thereby improving performance of the memory system.

It is intended that the foregoing detailed description be regarded as illustrative rather than limiting, and that it be understood that it is the following claims, including all equivalents, that are intended to define the spirit and scope of this invention.

The invention claimed is:

1. A re-programmable non-volatile mass storage system comprising:
a non-volatile memory;
a LBA interface configured to couple the re-programmable non-volatile mass storage system to a host system; and
a controller in communication with the non-volatile memory and the LBA interface, the controller configured to:
receive over the LBA interface a non-data command from the host system, where the non-data command does not result in a logical data transfer from the host system to the mass storage system; and
send information to the host system over the LBA interface in response to the non-data command, the information comprising one or more logical locations that the mass storage system recommends the host system allocate to a file.

2. The re-programmable non-volatile mass storage system of claim 1, wherein the one or more logical locations comprise a logical area that the mass storage system is currently updating.

3. The re-programmable non-volatile mass storage system of claim 1, wherein the controller is further configured to:
receive information associated with the file, the information comprising at least a file length and a file type.

4. The re-programmable non-volatile mass storage system of claim 3, wherein the controller is further configured to:
identify the one or more logical locations that may be allocated to the file based on at least the received file length and file type.

5. The re-programmable non-volatile mass storage system of claim 4, wherein the identified one or more logical locations comprises a specific preferred logical location that may be allocated to the file.

6. The re-programmable non-volatile mass storage system of claim 4, wherein the identified one or more logical locations comprises multiple logical locations over which to allocate fragments of the file.

7. The re-programmable non-volatile mass storage system of claim 4, wherein the identified one or more logical locations comprises a list of logical locations that may be allocated to the file.

8. The re-programmable non-volatile mass storage system of claim 7, wherein the identified one or more logical locations further comprises an indication of which logical location of the list of logical locations is a preferred location to allocate to the file.

9. The re-programmable non-volatile mass storage system of claim 7, wherein the identified one or more logical locations further comprises a rating for each logical location of the list of logical locations.

10. The re-programmable non-volatile mass storage system of claim 7, wherein the identified one or more logical locations further comprises an order of preference of each logical location of the list of logical locations.

11. A non-volatile mass storage system embedded in a host system, the non-volatile mass storage system comprising:
    a non-volatile memory; and
    a controller in communication with the host system via a LBA interface and in communication with the non-volatile memory, the controller configured to:
        receive over the LBA interface a non-data command from a controller of the host system, where the non-data command does not result in a logical data transfer from the host system to the mass storage system; and
        send information to the controller of the host system over the LBA interface in response to the non-data command, the information comprising one or more logical locations that the mass storage system recommends the host system allocate to a file.

12. The re-programmable non-volatile mass storage system of claim 11, wherein the one or more logical locations comprise a logical area that the mass storage system is currently updating.

13. The re-programmable non-volatile mass storage system of claim 11, wherein the controller is further configured to:
    receive information associated with the file, the information comprising at least a file length and a file type.

14. The re-programmable non-volatile mass storage system of claim 13, wherein the controller is further configured to:
    identify the one or more logical locations that may be allocated to the file based on at least the received file length and file type.

15. A host device comprising:
    an embedded host controller; and
    an embedded mass storage system in communication with the host controller, the embedded mass storage system comprising a non-volatile memory and a controller in communication with the embedded host controller via a LBA interface;
    wherein the controller of the embedded mass storage system is configured to:
        receive over the LBA interface a non-data command from the embedded host controller, where the non-data command does not result in a logical data transfer from the embedded host controller to the embedded mass storage system; and
        send information to the embedded host controller over the LBA interface in response to the non-data command, the information comprising one or more logical locations that the mass storage system recommends the embedded host controller allocate to a file.

16. The host device of claim 15, wherein the one or more logical locations comprise a logical area that the embedded mass storage system is currently updating.

17. The host device of claim 15, wherein the controller of the embedded mass storage device is further configured to:
    receive information associated with the file from the embedded host controller, the information comprising at least a file length and a file type.

18. The host device of claim 17, wherein the controller of the embedded mass storage device is further configured to:
    identify the one or more logical locations that may be allocated to the file based on at least the received file length and file type.

19. The host device of claim 15, wherein the embedded host controller is configured to:
    identify the file to be stored at the mass storage system;
    pass the non-data command to the embedded mass storage system via the LBA interface;
    receiving the information via the LBA interface from the mass storage system comprising one or more logical locations that the mass storage system recommends the embedded host controller allocate to the file; and
    allocate at least one of the one or more logical locations recommended by the mass storage system to the file.

20. The host device of claim 19, wherein the received one or more logical locations comprise a list of logical locations that may be allocated to the file and at least one of:
    an indication of which logical location of the list of logical locations is a preferred location to allocate to the file;
    a rating for each logical location of the list of logical locations; or
    an order of preference of each logical location of the list of logical locations.

* * * * *